United States Patent
Bernau et al.

(10) Patent No.: US 10,604,105 B2
(45) Date of Patent: Mar. 31, 2020

(54) METHOD FOR PRODUCING SOLID FUEL TABLETS, SOLID FUEL TABLETS, GAS GENERATOR, AND MODULE HAVING A GAS GENERATOR

(75) Inventors: Klaus Bernau, Soyen (DE); Christian Bichlmaier, Schonberg (DE); Sebastian Reichgruber, Engelsberg (DE)

(73) Assignee: TRW AIRBAG SYSTEMS GMBH, Aschau am Inn (DE)

( * ) Notice: Subject to any disclaimer, the term of this patent is extended or adjusted under 35 U.S.C. 154(b) by 124 days.

(21) Appl. No.: 13/823,165

(22) PCT Filed: Aug. 4, 2011

(86) PCT No.: PCT/EP2011/003917
§ 371 (c)(1),
(2), (4) Date: Mar. 14, 2013

(87) PCT Pub. No.: WO2012/055451
PCT Pub. Date: May 3, 2012

(65) Prior Publication Data
US 2013/0269562 A1    Oct. 17, 2013

(30) Foreign Application Priority Data

Oct. 29, 2010  (DE) .................. 10 2010 049 765

(51) Int. Cl.
*B60R 21/264*    (2006.01)
*F42B 5/16*    (2006.01)
(Continued)

(52) U.S. Cl.
CPC ........ *B60R 21/264* (2013.01); *B60R 21/2644* (2013.01); *C06B 45/00* (2013.01); *C06D 5/00* (2013.01); *F42B 5/16* (2013.01)

(58) Field of Classification Search
CPC ....................................................... C06B 45/00
See application file for complete search history.

(56) References Cited

U.S. PATENT DOCUMENTS 1,758,358 A * 5/1930 Ennis ............................ 102/317
4,581,998 A * 4/1986 Horst, Jr. .................. F42B 5/16
102/289

(Continued)

FOREIGN PATENT DOCUMENTS

DE    102004062936    7/2006
WO    2004094188    11/2004

*Primary Examiner* — Aileen B Felton
(74) *Attorney, Agent, or Firm* — Tarolli, Sundheim, Covell & Tummino LLP

(57) ABSTRACT

An inflator (30) comprises at least one combustion chamber (34), filled with a plurality of solid propellant pellets (10), each of the solid propellant pellets (10) including a surface having a breaking point (19) which is delimited at least by two converging surfaces (28) produced by pressing. A method of manufacturing solid propellant pellets (10), includes the steps of providing a solid propellant (12), pressing the solid propellant (12) into a pellet blank (16), the pellet blank (16) having at least one predetermined breaking point (18) which divides the pellet blank (16) into at least two subareas (20), and breaking the pellet blank (16) along the at least one predetermined breaking point (18), wherein each of the at least two subareas (20) forms a solid propellant pellet (10).

4 Claims, 4 Drawing Sheets

(51) Int. Cl.
*C06B 45/00* (2006.01)
*C06D 5/00* (2006.01)

(56) References Cited

U.S. PATENT DOCUMENTS

| | | | |
|---|---|---|---|
| 5,019,220 A | | 5/1991 | Taylor et al. |
| 5,351,619 A | * | 10/1994 | Chan et al. .................... 102/289 |
| 6,039,820 A | * | 3/2000 | Hinshaw .................. C06D 5/06 102/289 |
| 6,136,111 A | * | 10/2000 | Lemons .................. C06D 5/06 149/19.3 |
| 6,196,581 B1 | | 3/2001 | Katsuda et al. |
| 6,234,521 B1 | | 5/2001 | Katsuda et al. |
| 6,409,214 B2 | | 6/2002 | Katsuda et al. |
| 6,427,599 B1 | * | 8/2002 | Posson et al. ................. 102/336 |
| 6,695,345 B2 | | 2/2004 | Katsuda et al. |

* cited by examiner

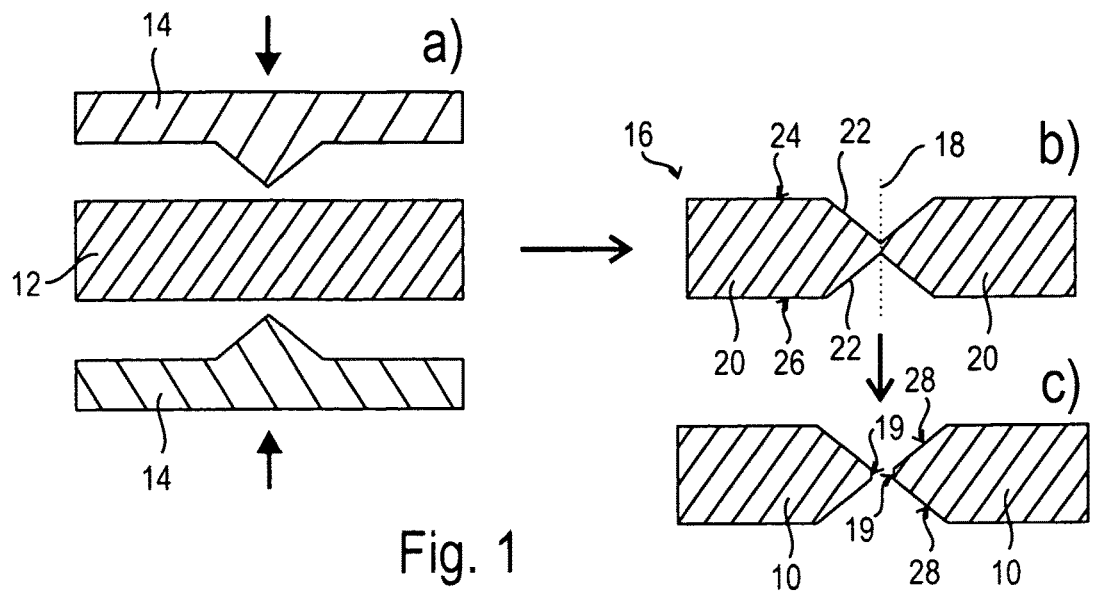
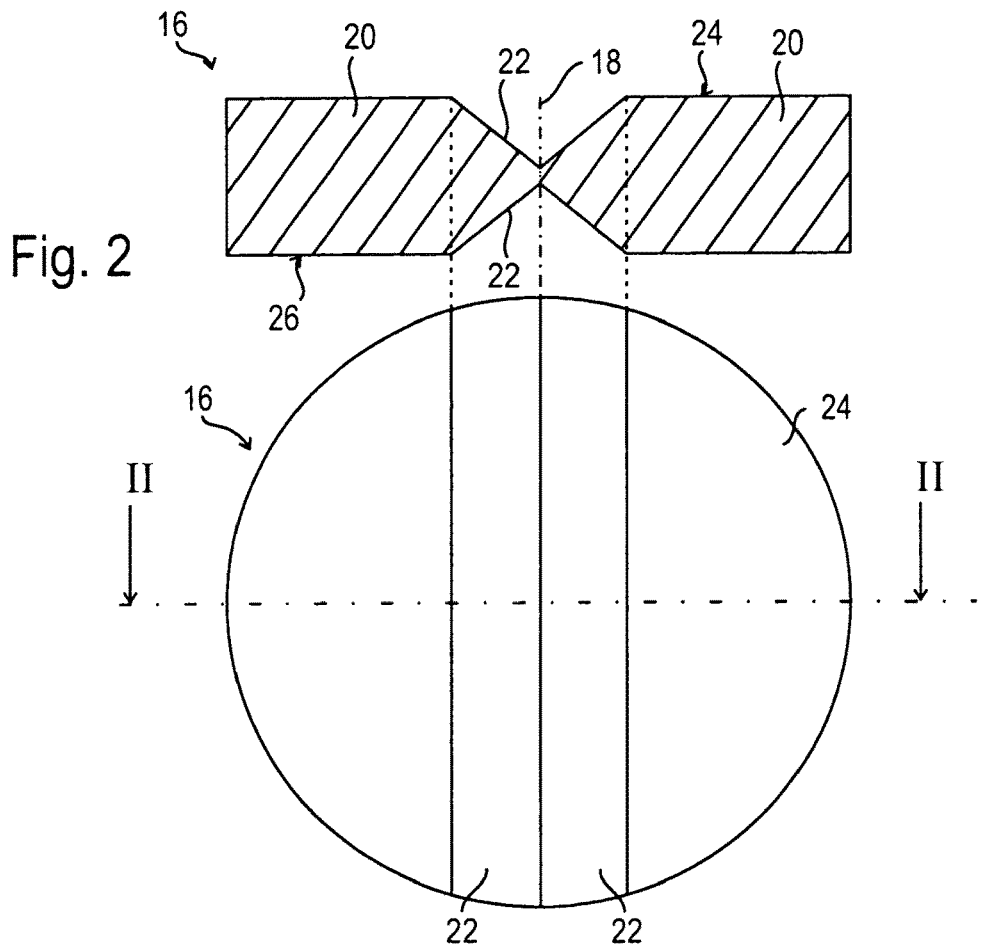
Fig. 1
Fig. 2

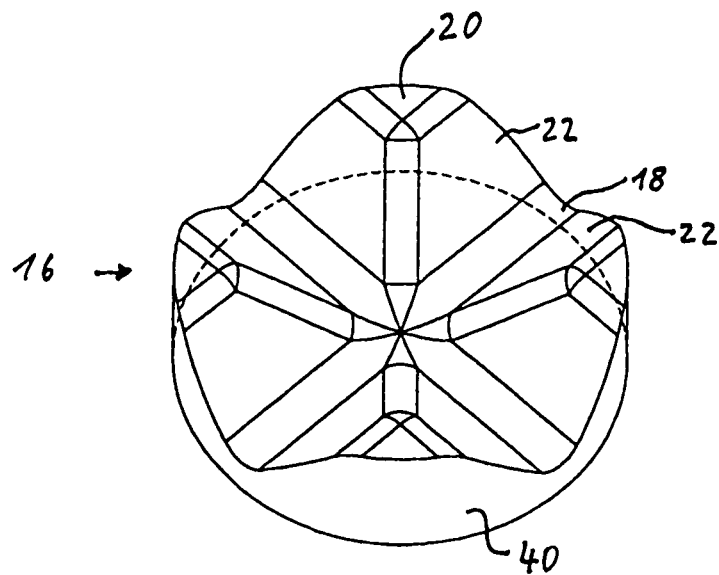
Fig. 7
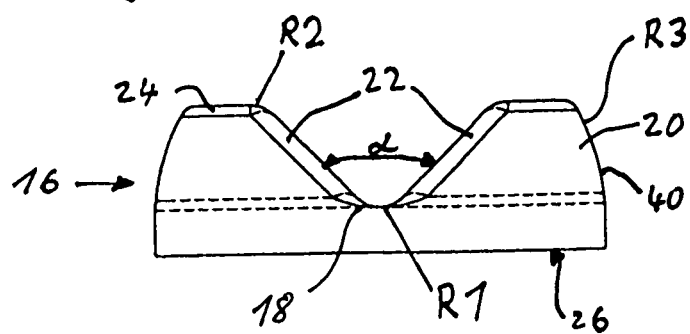
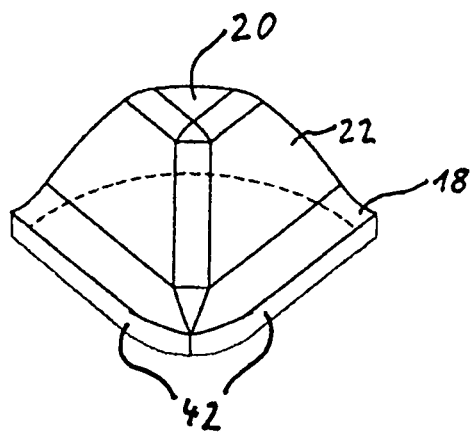
Fig. 8
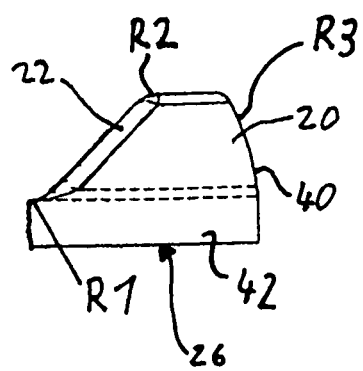

METHOD FOR PRODUCING SOLID FUEL TABLETS, SOLID FUEL TABLETS, GAS GENERATOR, AND MODULE HAVING A GAS GENERATOR

RELATED APPLICATIONS

This application corresponds to PCT/EP2011/0003917, filed Aug. 4, 2011, which claims the benefit of German Application No. 10 2010 049 765.7, filed Oct. 29, 2010, the subject matter, of which are incorporated herein by reference in their entirety.

BACKGROUND OF THE INVENTION

The invention relates to a method of manufacturing solid propellant pellets, especially for an inflator and/or a pyrotechnical actuator of a vehicle occupant restraint system, a solid propellant pellet, an inflator including at least one combustion chamber and a module including said inflator.

It is known from prior art to press solid propellant pellets for inflators from a powdered or granulated solid propellant into cylindrical shape. Solid propellant pellets of this type only permit a limited ratio between the surface and the volume of the pellet, however. In order to permit rapid pressure increases in the inflator an as high ratio of the surface to the volume of the solid propellant as possible is desirable.

It is further known to use solid propellant in the form of granulate of different grain sizes for inflators. In the case of such granulate no defined surface-to-volume ratio can be determined, however, which results in a certain variation of the performance of the inflators. The surface structure of such granulate in general is undefined and such granulate can have an additional proportion of broken granulate or granulate dust, which may equally result in a certain variation of the performance of the inflators.

SUMMARY OF THE INVENTION

It is the object of the invention to provide a method of manufacturing solid propellant pellets having a defined and optimized surface-to-volume ratio as well as a solid propellant pellet and a powerful inflator and a module for a vehicle occupant restraint system including such inflator.

The object is achieved by a method according to the invention for manufacturing solid propellant pellets, especially for an inflator and/or a pyrotechnical actuator of a vehicle occupant restraint system. The method comprises the steps of providing a solid propellant, pressing the solid propellant into a pellet blank, wherein the pellet blank has at least one predetermined breaking point dividing the pellet blank into at least two subareas, and breaking the pellet blank along the at least one predetermined breaking point, each of the at least two subareas forming a solid propellant pellet. In this way solid propellant pellets having a small volume and a large surface can be manufactured which do not have to be pressed individually. Thus the surface-to-volume ratio can be optimized. Since the pellet blank is broken along the predetermined breaking point, a defined geometry of the solid propellant pellets and thus a defined surface-to-volume ratio of the solid propellant pellets are provided. Moreover, the particularly small volume of solid propellant pellets manufactured in this way has the advantage that even combustion chambers of an inflator that have a complex spatial configuration can be filled very efficiently with said solid propellant pellets as regards the use of a combustion space. Hence an optimized filling density can be obtained in this respect.

Preferably the pellet blank is broken while being ejected from a press. In this way the process step of breaking is combined with that of pressing the pellet blank so that no separate working step is necessary in the manufacturing method for breaking the pellet blank.

Alternatively, the pellet blank can form an intermediate product and can be broken in a process step separate from pressing. This enables the pellet blanks to be stored or transported, for instance, before breaking them.

According to a preferred embodiment, the predetermined breaking point is formed by a portion of reduced pellet thickness. In this way the predetermined breaking point can be produced by the shape of the press.

For instance, the pellet thickness can be continuously reduced toward the predetermined breaking point.

A simple geometry of the pellet blank and of the required shape of the press is enabled by designing the pellet blank to have a flat and/or cylindrical shape, the predetermined breaking point being formed in at least one of the opposed end faces and/or by the predetermined breaking point constituting a predetermined breaking line, wherein the predetermined breaking line preferably extends from one portion of the periphery of the pellet blank to another portion of the periphery of the pellet blank.

The radius of the pellet blank can be more than or equal to one millimeter, preferably within a range of 1 mm to 5 mm, further preferred within a range of 1.5 mm to 4.5 mm, especially preferred within a range of 2.5 mm to 3.5 mm. The breaking of the pellet blank allows for dimensions of the solid propellant pellet of less than one millimeter, while the pressing mold of the table blank can also be larger than one millimeter. Thus no pressing molds having a radius of less than one millimeter have to be provided.

The solid propellant is preferably provided in the form of powder having a maximum grain size of 200 µm or in the form of granulate having an average grain size of more than 200 µm.

In order to obtain an as exact surface-to-volume ratio of the solid propellant pellets as possible all solid propellant pellets of a pellet blank can have a substantially equal configuration.

As an alternative, at least two solid propellant pellets of a pellet blank have a different configuration. The geometries of the different solid propellant pellets can be configured, for instance, for optimizing the package in a combustion chamber of an inflator.

The object of the invention relating to the solid propellant pellet is achieved, according to the invention, by the fact that a solid propellant pellet manufactured of a pressed pellet blank having at least one predetermined breaking point by breaking the pellet blank along the at least one predetermined breaking point substantially exhibits the shape of a cylinder sector. By cylinder sector in accordance with the invention a three-dimensional form is understood for which in general also the term "slice of cake" is used. That is to say, it is a segment which is (theoretically) "broken out" of a substantially cylindrical basic form, wherein the breaking edges or fracture surfaces extend in the direction of the center of the basic cylindrical form starting from the circumferential surface. Accordingly, a subarea of the circumferential surface of the basic cylindrical form is retained and is in the form of a circular arc, viewed in the top view of the cylinder sector.

An embodiment of the solid propellant pellet can have a circumferential surface including one portion in the form of a straight cylinder and one connected portion with a convex curvature, especially in the direction of the center of the pellet blank.

Afore-described solid propellant pellets can include fracture surfaces formed by breaking having a higher surface roughness than the other surfaces delimiting the solid propellant pellet, especially the circumferential surface and/or the upper and lower end faces.

The object of the invention is further achieved by an inflator according to the invention having at least one combustion chamber. The combustion chamber is filled, in the non-activated state of the inflator, with a plurality of solid propellant pellets, wherein all or part of the solid propellant pellets exhibit a surface having a breaking point which is delimited at least by two converging surfaces produced by pressing. The solid propellant pellets are preferably manufactured according to the afore-described method. The two surfaces produced by pressing define the breaking point of the solid propellant pellets so that the solid propellant pellets have a substantially fixedly defined geometry despite their breaking point.

Preferably the two opposed pressed surfaces extend at an angle of between 45° and 180° with respect to each other.

For an as exact determination as possible of the surface-to-volume ratio of the solid propellant pellets in the combustion chamber of the inflator the solid propellant pellets preferably are fractions of a pellet blank and substantially have an equal design.

The combustion chamber of the inflator according to the invention is filled especially with a chaotic filling of propellant pellets and in addition may include a filter.

The object of the invention furthermore is achieved by a module according to the invention including an afore-described inflator according to the invention. The module additionally includes an inflatable airbag and a fastening means for mounting the module, especially in the interior of a vehicle.

BRIEF DESCRIPTION OF THE DRAWINGS

Further features and advantages of the invention are resulting from the following description and the following drawings that are referred to and in which FIG. 1 shows a schematic representation of a method of manufacturing solid propellant pellets according to the invention.

FIG. 2 shows a first embodiment of a pellet blank manufactured in accordance with a method according to the invention.

FIG. 7 is a fifth embodiment of a pellet blank manufactured in accordance with a method according to the invention.

FIG. 8 shows a solid propellant pellet according to the invention after breaking the pellet blank according to FIG. 7 along at least one predetermined breaking point.

DESCRIPTION

Figure 3:
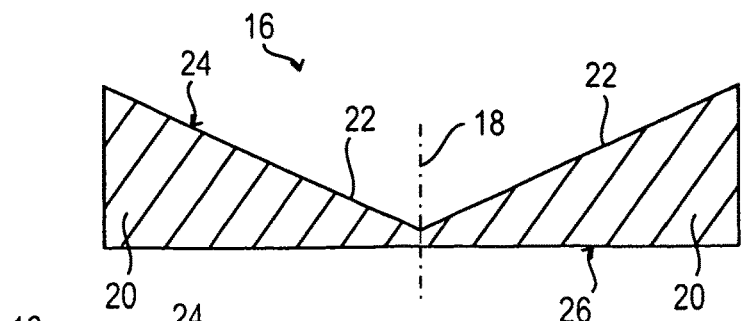
FIG. 3 shows a sectional view of a second embodiment of a pellet blank manufactured in accordance with a method according to the invention.

A method of manufacturing solid propellant pellets 10 is schematically shown in FIG. 1. In part a) of the picture a first process step is shown in which a powdered solid propellant 12 is provided in a working chamber of a press 14. In a subsequent process step the solid propellant 12 is pressed into a pellet blank 16 by the press 14.

The pressed pellet blank 16 is shown in part b) of the picture. In the middle of the pellet blank 16 a predetermined breaking point 18 indicated by the dotted line is provided which divides the pellet blank 16 into two subareas 20.

In a final process step the pellet blank 16 is broken along the predetermined breaking point 18, each of the two subareas 20 forming a solid propellant pellet 10. The two broken-apart solid propellant pellets 10 are shown in part c) of the picture.

Since the size of the pellet blank 16 is a multiple of the size of the solid propellant pellets 10, the working chamber of the press 14 can be configured to be appropriately larger than the finished solid propellant pellets 10.

The method permits the manufacture of solid propellant pellets 10 having a larger surface-to-volume ratio compared to conventional cylindrical pellets.

As is clearly visible in part c) of the picture of FIG. 1, each solid propellant pellet 10 has a surface including a breaking point 19 which is delimited by at least two converging surfaces 28 produced by pressing. In the shown embodiment the two pressed surfaces 28 of a solid propellant pellet 10 converge at an angle of approx. 80°.

FIG. 2 shows in the lower portion a top view of the pellet blank 16 and in the upper portion a sectional view according to the sectional plane II-II. The pellet blank 16 includes a portion 22 of reduced pellet thickness which extends over the entire diameter of the pellet blank 16 and forms the predetermined breaking point 18 at the position having the smallest pellet thickness. In this case the predetermined breaking point 18 is shown by a dash-dotted line as predetermined breaking line 18.

The pellet blank 16 has a flat and cylindrical shape, wherein a respective portion 22 of reduced pellet thickness is provided in the upper end face 24 and in the lower end face 26 of the pellet blank 16. The portions 22 of reduced pellet thickness are formed symmetrically with respect to the predetermined breaking line 18.

Alternatively, instead of the shown portions 22 of reduced pellet thickness with continuous reduction of the pellet thickness in the form of V-shaped notches, the pellet blanks 16 can also have grooves in which the pellet thickness decreases in one or more steps.

FIG. 3 illustrates a second embodiment of a pellet blank 16, wherein the portion 22 of reduced pellet thickness extends over the entire upper end face 24 and the pellet thickness continuously decreases toward the predetermined breaking line 18.

Figure 4:
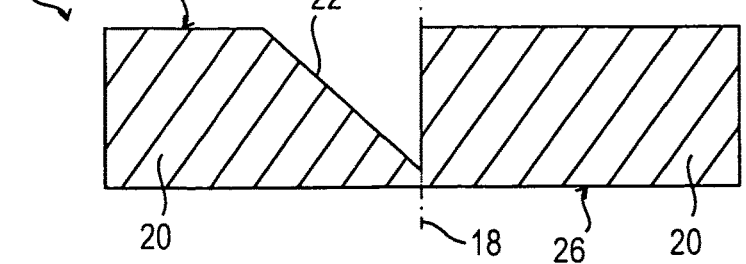
FIG. 4 shows a sectional view of a third asymmetric embodiment of a pellet blank manufactured in accordance with a method according to the invention.

FIG. 4 shows a third embodiment of a pellet blank 16 having an asymmetrically designed predetermined breaking point 18 in which only in the left subarea 20 a portion 22 of reduced pellet thickness is provided.

By the asymmetric predetermined breaking point 18 for instance differently configured solid propellant pellets 10 can be manufactured from one pellet blank 16. As an alternative, each of the subareas 20 of the pellet blank 16 can have two asymmetric predetermined breaking points 18 which are symmetrical to each other and restore symmetry of the solid propellant pellets 10.

Figure 5:
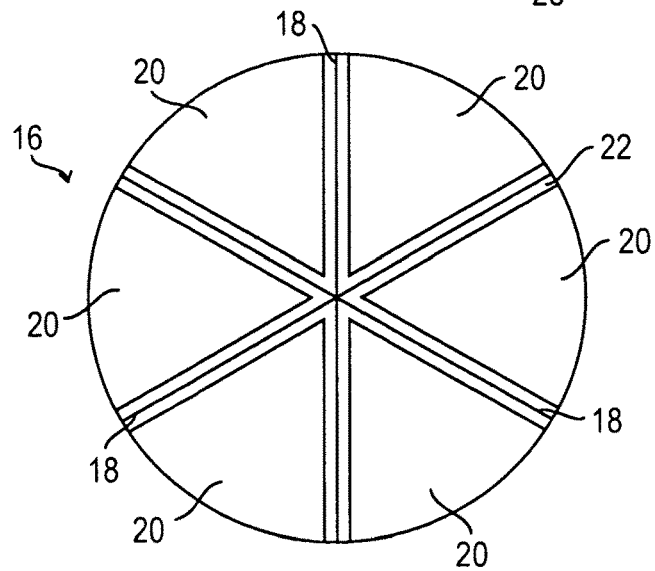
FIG. 5 shows a top view of a fourth embodiment of a pellet blank manufactured in accordance with a method according to the invention.

FIG. 5 illustrates a fourth embodiment of a pellet blank 16 having six subareas 20 which are interconnected by portions 22 of reduced pellet thickness and a predetermined breaking point 18. All subareas 20 have an equal design, whereby after the breaking of the pellet blank 16 all solid propellant pellets 10 of the pellet blank 16 have a substantially equal design. Small tolerances may occur in the area of the breaking points 19 upon breaking the pellet blank 16.

All pellet blanks are broken before filling the combustion chamber, especially immediately after pressing.

Figure 6:
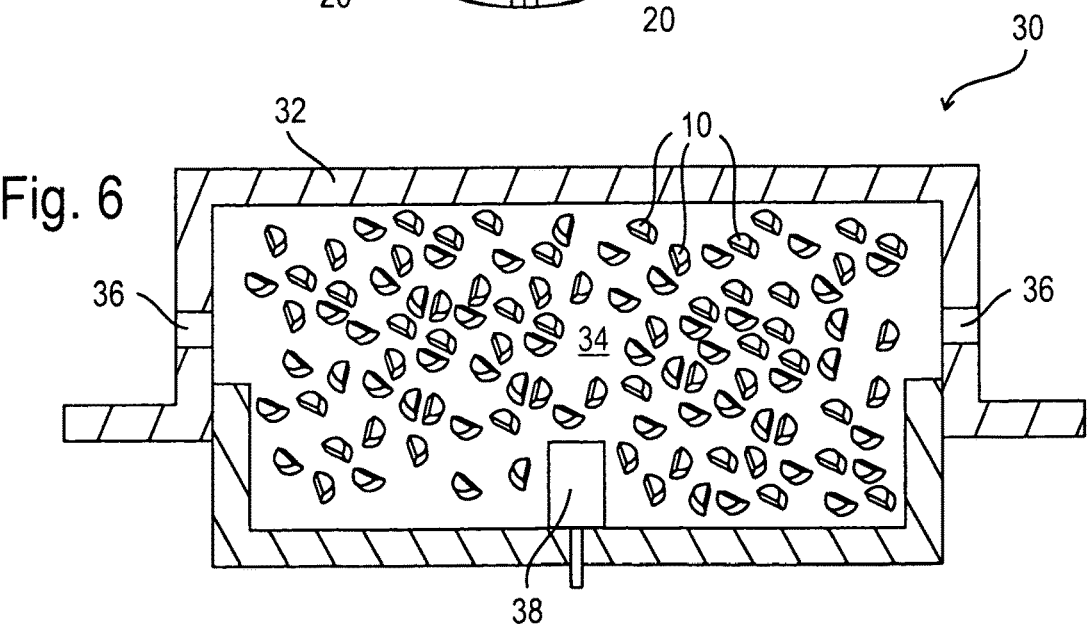
FIG. 6 shows a schematic sectional view of an inflator according to the invention.

FIG. 6 shows a schematic side view of an inflator 30 including a housing 32 and a combustion chamber 34. The combustion chamber 34 is associated with discharge orifices 36 in the housing 32 and with an igniter 38. The combustion chamber 34 moreover can include a filter not shown here.

In the non-activated state of the inflator 30 the combustion chamber 34 is filled with a plurality of solid propellant pellets 10 (chaotic filling). The solid propellant pellets 10 are designed analogously to the solid propellant pellets 10 depicted in FIG. 1 part c) of the picture. However, also other solid propellant pellets 10 could be provided which are formed, for example, by breaking the pellet blanks 16 shown in the FIGS. 3 to 5.

In the embodiment illustrated in FIG. 6 all of the solid propellant pellets 10 have a substantially equal configuration. In this way a defined surface-to-volume ratio of the solid propellant pellets 10 is resulting in the inflator 30. From the large overall surface of the solid propellant pellets 10 a rapid pressure increase is resulting upon activation of the inflator by the igniter 38. Since the surface-to-volume ratio of the solid propellant pellets 10 is exactly defined, a small variation of the performance of the inflator 30 is resulting.

FIG. 7 shows in the upper area a perspective view and in the lower area a side view of a fifth embodiment of a pellet blank 16 having four subareas 20 which are interconnected by respective portions 22 having a reduced pellet thickness and a predetermined breaking point 18. The number of the subareas 20 can also be more than four subareas 20, at least a multiple of the number of two, i.e. for instance six, eight or ten. Opposed flat-shaped portions 22 of two respective neighboring subareas 20 are positioned at an angle $\alpha=90°$ with respect to each other. The angle $\alpha$ can be within a range of from 40° to 140°, wherein especially values of 95°, 100°, 105°, 85°, 80° or 75° are imaginable. In the area of the predetermined breaking point 18 the flat-shaped portions 22 of neighboring subareas 20 having a radius R1=0.15 mm are transformed into each other. Moreover, in each of the four subareas 20 one portion of the upper end face 24 of the pellet blank 16 and one flat-shaped portion 22 having a radius R2=0.15 mm are transformed into each other. The radii R1, R2 can be within a range of from 0.05 mm to 0.25 mm.

The pellet blank 16 includes a circumferential surface 40 extending in a curved shape in some portions. As is visible from the side view (lower portion of FIG. 7), the circumferential surface 40 is designed in a lower portion, starting from the lower end face 26 of the pellet blank 16 up to the height of the predetermined breaking point 18, in the form of a straight cylinder. In its further course from the height of the predetermined breaking point to the upper end face 24 of the pellet blank, the circumferential surface 40 has a convex curvature having a radius R3 in the direction of the center of the pellet blank 16.

All subareas 20 have an equal configuration, which results in the fact that after breaking the pellet blank 16 all solid propellant pellets 10 of the pellet blank 16 substantially have an equal design. Small tolerances may occur in the area of the breaking points 19 upon breaking the pellet blank 16.

In the left portion of FIG. 8 a perspective view is illustrated and in the right portion the pertinent side view of a solid propellant pellet 10 according to the invention is shown manufactured by breaking along at least two predetermined breaking points 18 of a pellet blank 16, as illustrated in FIG. 7, with fracture surfaces 42 being formed.

Figure 9:
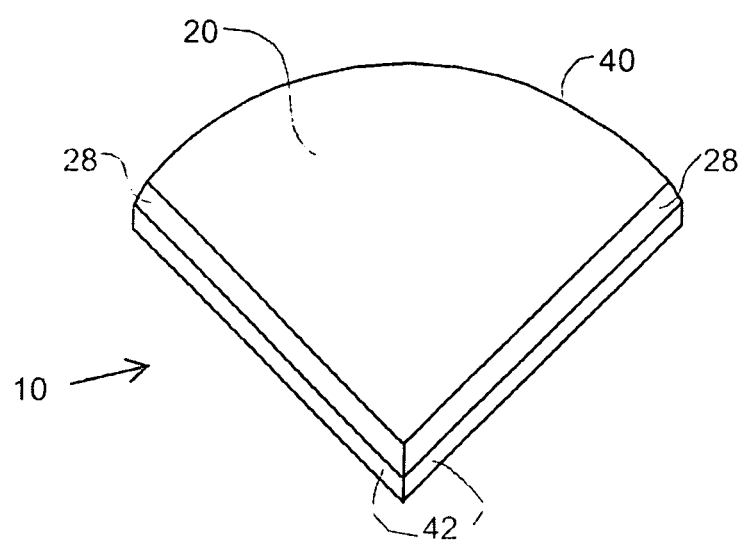
FIG. 9 shows a solid propellant pellet according to the invention after breaking the pellet blank according to FIG. 5 along at least one predetermined breaking point.

FIG. 9 shows a solid propellant pellet 10 according to the invention manufactured by breaking a pellet blank 16, as shown in FIG. 5, along at least two predetermined breaking points 18 with two fracture surfaces 42 being formed. The solid propellant pellet 10 includes a circumferential surface 40 representing a subarea of a circumferential surface of the original pellet blank 16. The circumferential surface 40, the two surfaces 28 and the two end faces 24, 26 (cf. FIG. 3) are formed by pressing the pellet blank 16 and have relatively smooth surfaces, whereas the two fracture surfaces 42 have a relatively rough surface.

It is also imaginable, as a matter of course, that not only one single subarea 20 but also plural coherent subareas 20 can be broken out of a pellet blank 16 as shown in FIG. 5 (cf. FIG. 9).

It is further possible to break the pellet blank 16 as shown in FIG. 2 along the predetermined breaking point 18 so as to obtain two solid propellant pellets 10 according to the invention.

In all afore-described cases of a solid propellant pellet 10 manufactured by breaking a pellet blank 16 a solid propellant pellet 10 is formed which substantially has the shape of a cylinder sector.

The invention moreover comprises a module not represented including an afore-described inflator according to the invention. Such module furthermore includes an airbag inflatable by said inflator and a fastening means for mounting the module, especially in the interior of a vehicle.

The invention claimed is:

1. A solid propellant pellet (10) manufactured from a pressed pellet blank (16) having at least one predetermined breaking point (18) by breaking the pellet blank (16) along the at least one predetermined breaking point (18), the solid propellant pellet substantially exhibiting the shape of a cylinder sector having an upper end face and a lower end face, the at least one predetermined breaking point extending across at least one of the upper end face and the lower end face.

2. The solid propellant pellet (10) according to claim 1, wherein the pellet (10) includes a circumferential surface (40) which has one portion in the form of a straight cylinder and a connected portion exhibiting a convex curvature, especially in the direction of the center of the pellet blank (16).

3. The solid propellant pellet (10) according to claim 1, wherein fracture surfaces (42) formed by breaking have a higher surface roughness than the other surfaces delimiting the solid propellant pellet (10), especially the circumferential surface (40) and/or the upper and lower end faces (24, 26).

4. The solid propellant pellet according to claim 1, wherein the predetermined breaking point is delimited by at least two converging surfaces that each extend from at least one of the upper end face and the lower end face.

* * * * *